United States Patent
Cherkas et al.

(10) Patent No.: US 11,546,354 B2
(45) Date of Patent: Jan. 3, 2023

(54) NETWORK SHUTDOWN FOR CYBER SECURITY

(71) Applicant: KYNDRYL, INC., New York, NY (US)

(72) Inventors: Jack Louis Cherkas, London (GB); Clea Zolotow, Key West, FL (US); Kim Poh Wong, Singapore (SG); Susheel Gooly, Singapore (SG); Jørgen Egbert Floes, Stenløse (DK); Jeanette Louise Livings, Leamington Spa (GB); Tedrick N. Northway, High Springs, FL (US)

(73) Assignee: KYNDRYL, INC., New York, NY (US)

( * ) Notice: Subject to any disclaimer, the term of this patent is extended or adjusted under 35 U.S.C. 154(b) by 444 days.

(21) Appl. No.: 16/695,778

(22) Filed: Nov. 26, 2019

(65) Prior Publication Data

US 2021/0160255 A1     May 27, 2021

(51) Int. Cl.
*H04L 9/40*     (2022.01)
*G06N 7/00*     (2006.01)

(52) U.S. Cl.
CPC ......... *H04L 63/1416* (2013.01); *G06N 7/005* (2013.01)

(58) Field of Classification Search
CPC .................. H04L 63/1416; H04L 63/1433
See application file for complete search history.

(56) References Cited

U.S. PATENT DOCUMENTS

| | | | | |
|---|---|---|---|---|
| 6,519,703 | B1 * | 2/2003 | Joyce | H04L 63/0263 |
| | | | | 709/224 |
| 8,272,061 | B1 * | 9/2012 | Lotem | H04L 63/1416 |
| | | | | 709/224 |
| 9,210,181 | B1 * | 12/2015 | Nandy | H04L 63/1416 |
| 9,294,495 | B1 * | 3/2016 | Francoeur | H04L 63/1433 |
| 9,690,932 | B2 * | 6/2017 | Touboul | G06F 21/55 |
| 10,284,574 | B1 * | 5/2019 | Aziz | G06F 21/56 |
| 2002/0104014 | A1 * | 8/2002 | Zobel | G06F 21/577 |
| | | | | 726/26 |
| 2003/0105976 | A1 * | 6/2003 | Copeland, III | H04L 29/06 |
| | | | | 709/224 |
| 2005/0193430 | A1 * | 9/2005 | Cohen | H04L 63/1433 |
| | | | | 726/25 |

(Continued)

OTHER PUBLICATIONS

Natalia Miloslavskaya et al, "Big Data, Fast Data and Data Lake Concepts", p. 300-305. (Year: 2016).*
Anonymous, "Cisco Tetration FAQ", Cisco and/or its affiliates, Mar. 8, 2019, 12 pages.

(Continued)

*Primary Examiner* — Ponnoreay Pich
(74) *Attorney, Agent, or Firm* — John Kennel; Andrew M. Calderon; Calderon Safran & Cole P.C.

(57) ABSTRACT

A method includes: determining, by a computer device, affinities between components in a networked computer system; determining, by the computer device, a risk level of each of the components; determining, by the computer device, a risk level of the networked computer system; detecting, by the computer device, a threat in the networked computer system; determining, by the computer device, an action based on the threat, the risk level of ones of the components affected by the threat, and the risk level of the system; and reconfiguring, by the computer device, the networked computer system based on the determined action.

20 Claims, 7 Drawing Sheets

(56) References Cited

U.S. PATENT DOCUMENTS

| | | | | |
|---|---|---|---|---|
| 2006/0005245 | A1* | 1/2006 | Durham | H04L 63/1441 726/25 |
| 2007/0180526 | A1* | 8/2007 | Copeland, III | H04L 63/1416 709/224 |
| 2007/0192863 | A1* | 8/2007 | Kapoor | H04L 63/145 726/23 |
| 2008/0189788 | A1* | 8/2008 | Bahl | H04L 63/1416 726/25 |
| 2009/0064334 | A1* | 3/2009 | Holcomb | H04L 63/1408 726/24 |
| 2013/0191919 | A1* | 7/2013 | Basavapatna | H04L 63/20 726/25 |
| 2014/0373161 | A1* | 12/2014 | Hudson | H04L 63/1433 726/25 |
| 2015/0347759 | A1* | 12/2015 | Cabrera | H04L 63/1425 726/25 |
| 2016/0173511 | A1* | 6/2016 | Bratspiess | H04L 63/0209 726/23 |
| 2017/0034128 | A1* | 2/2017 | Paul | H04L 63/145 |
| 2017/0155676 | A1* | 6/2017 | Tamir | G06F 11/2094 |
| 2017/0250823 | A1* | 8/2017 | Glenn | G06F 21/606 |
| 2018/0077195 | A1* | 3/2018 | Gathala | H04L 63/1433 |
| 2018/0190096 | A1* | 7/2018 | Lundy | G08C 17/02 |
| 2018/0205754 | A1* | 7/2018 | North | H04L 63/145 |
| 2018/0260574 | A1* | 9/2018 | Morello | G06F 9/44505 |
| 2018/0295148 | A1* | 10/2018 | Mayorgo | H04W 4/70 |
| 2019/0052664 | A1* | 2/2019 | Kibler | G06F 11/301 |
| 2019/0188616 | A1* | 6/2019 | Urban | G06Q 10/0875 |
| 2020/0249928 | A1* | 8/2020 | Zeng | G06F 9/4881 |
| 2020/0322369 | A1* | 10/2020 | Raghuramu | H04L 63/1433 |
| 2020/0351295 | A1* | 11/2020 | Nhlabatsi | H04L 63/1441 |
| 2021/0160255 | A1* | 5/2021 | Cherkas | H04L 63/20 |

OTHER PUBLICATIONS

Anonymous, "Cisco Tetration", Cisco, downloaded Oct. 21, 2019, 17 pages.
Anonymous, "Data Lake", Wikipedia, downloaded Oct. 21, 2019, 3 pages.
Raynovich, "How Does Micro-Segmentation Help Security? Explanation", SDxCentral, LLC, Mar. 8, 2016, 3 pages.
Anonymous, "IBM Service Request tool", IBM, downloaded Oct. 21, 2019, 2 pages.
Munoz-Gonzalez et al., "Exact Inference Techniques for the Analysis of Bayesian Attack Graphs", Department of Computing at Imperial College, London, Nov. 4, 2016, 14 pages.
Anonymous, "Configuration Management Database", ServiceNow, downloaded Oct. 21, 2019, 6 pages.
Wilson, "What is IPFIX—The Protocol that's giving Netflow Analyzing a Run for its Money!", PCWDLD.com, Jul. 26, 2016, 8 pages.
Anonymous, "Discover, Optimize and Troubleshoot App Security and Network Connectivity", VMware, downloaded Oct. 21, 2019, 8 pages.
Mell, "The NIST Definition of Cloud Computing", National Institute of Standards and Technology, Sep. 2011, 7 pages.
Haq, "SDN-inspired, Real-time Botnet Detection and Flow-blocking at ISP and Enterprise-level", IEEE ICC, Next Generation Networking Symposium, 2015, 6 pages.
Anonymous, "SDN Security Considerations in the Data Center", ONF Solution Brief, Oct. 8, 2013, 12 pages.
Anonymous, "The new standard in third-party risk and attack surface management", https://www.upguard.com/, accessed Jul. 17, 2022, 8 pages.
Anonymous, "Automatic Cyber Attack Defense Solution (Palo Alto Networks Integration)", https://web.archive.org/web/20180320224346/http://www.nec.com/en/global/solutions/sdn/sol_cyber.html, accessed Jul. 17, 2022, 3 pages.

* cited by examiner

NETWORK SHUTDOWN FOR CYBER SECURITY

BACKGROUND

Aspects of the present invention relate generally to networked computer systems and, more particularly, to systems and methods for network shutdown for cyber security.

Computer security, cybersecurity, or information technology security (IT security) is the protection of computer systems from the theft of or damage to their hardware, software, or electronic data, as well as from the disruption or misdirection of the services they provide.

SUMMARY

In a first aspect of the invention, there is a computer-implemented method including: determining, by a computer device, affinities between components in a networked computer system; determining, by the computer device, a risk level of each of the components; determining, by the computer device, a risk level of the networked computer system; detecting, by the computer device, a threat in the networked computer system; determining, by the computer device, an action based on the threat, the risk level of ones of the components affected by the threat, and the risk level of the system; and reconfiguring, by the computer device, the networked computer system based on the determined action.

In another aspect of the invention, there is a computer program product including one or more computer readable storage media having program instructions collectively stored on the one or more computer readable storage media, the program instructions executable to: determine affinities between components in a networked computer system by analyzing data in a data lake; detect a threat in the networked computer system; determine a risk assessment based on a risk level of the threat, risk levels of the components, and a risk level of the networked computer system; determine an action based on the risk assessment; and reconfigure the networked computer system based on the determined action.

In another aspect of the invention, there is system including a processor, a computer readable memory, and a computer readable storage medium. The system includes: program instructions to determine affinities between components in a networked computer system by analyzing data in a data lake; program instructions to detect a threat in the networked computer system; program instructions to determine a risk assessment based on a risk level of the threat, risk levels of the components, and a risk level of the networked computer system; program instructions to determine an action based on the risk assessment; and program instructions to reconfigure the networked computer system based on the determined action and automatically using software defined networking. The program instructions are stored on the computer readable storage medium for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to networked computer systems and, more particularly, to systems and methods for network shutdown for cyber security. Implementations of the invention provide a methodology to control against unwanted spread of malware, systematic patches, and other type of code installation that is unwanted while keeping application uptime availability as much as possible. Embodiments utilize various data inputs to build the application affinities between the various functions (such as web, middleware, and database), utilize software-defined networking (SDN) to build software firewalls and micro-segmentation instances, and utilize software and human intervention to determine the spread of unwanted code installation. Further embodiments determine a risk assessment based on Bayesian characteristics to ensure that more critical functions are at the lowest risk possible for application downtime from unwanted code interruption. In this manner, implementations of the invention provide a system and a method to prevent malware spread while preserving application uptime by determining affinities between applications and components from available data and using software-defined networking (SDN) to configure/reconfigure a networked computer environment in response to a threat.

According to aspects of the invention, when an enterprise is under a cyberattack, the inventive system may be used to lock down network connectivity to restrict the spread of ransomware, malware, bad patches, and/or incorrect upgrades that are mass-applied to reduce impact to the enterprise and enable quick recovery. Processes described herein may be integrated with Business Process Management (BPM) at the broker level. In embodiments, an orchestration component is responsible for shutting down the vLAN (virtual LAN), isolating the cluster, moving vNICs (virtual network interface card), generating microsegments, and enabling firewalls, to mitigate the spread of any malfeasance, whether intentional or not.

Aspects of the invention employ an IT as a Service (ITaaS) approach by utilizing an application uptime methodology based on risk assessment, as opposed to focusing on individual infrastructure components that rely on one component (e.g., firewall utilization). Embodiments of the invention utilize firewalls, also utilize micro-segmentation and SDN application resiliency with orchestration to limit or completely reduce application downtown. Embodiments may also utilize one or more of: an isolation zone to automatically clean images; a re-IP methodology; and a re-start (e.g., green button) to ensure that an affected system (e.g., a datacenter) is returned back to normal. In this manner, implementations of the invention provide the ability to orchestrate a targeted network shutdown across a dispersed network estate whether small or large, when an enterprise is under a cyber-attack to mitigate the spread of the cyber-attack. In this manner, implementations of the invention also resolve incorrect patch spread and/or virus attack without application downtime, which advantageously reduces or avoids SLA penalties and increases customer satisfaction.

Some systems take various data inputs from many different tools, clean the data, and analyze the data by hand. This type of solution is untenable as it can lead to miscues, e.g., rebooting a server after a cyber-attack and forgetting to set up various items such as anti-virus. In contrast, aspects of the invention utilize a data lake that provides the ability to stop an infection at computer speed instead of human speed. This is advantageous since, during a cyber-attack, there is typically a short window within which to perform protective actions. That is to say, because of the speed of infection during a cyber-attack, human-based solutions often take too long to implement. In one example, a human-based solution took hours to shut down infected computers during a cyber-attack on a corporation, and took three weeks to restore the environment after the attack and shut down. Aspects of the invention, on the other hand, utilize an automated big red button (BRB) to shut down an infected computer, a portion of a network, or an entire network, within seconds of a threat being detected. In this manner, implementations of the invention advantageously reduce the amount of time that an infection is left unchecked in an enterprise network, e.g., from hours to seconds. Moreover, aspects of the invention utilize a big green button (BGB) to automatically restore the infected system to its pre-infected state is much less time than manual solutions.

Embodiments of the invention utilize the following inputs when performing processes described herein: knowledge of (e.g., data defining) the applications/inventory in the networked system; knowledge of (e.g., data defining) the network (e.g., components included in the networked system); correlation of data from multiple sources (such as anti-virus, monitoring, discovery tools, logging/syslog, etc.) into a data lake; software defined networking (firewalls) or SDNaaS; ability to automate uptime/downtime of applications via customer control and SLA availability; knowledge of (e.g., data defining) an event that is occurring to start the process. In one example, the knowledge of an event occurring is obtained from one or more firewalls in the networked system, wherein these firewalls are configured to perform packet inspection and intrusion detection. In this example, these firewalls analyze the data going across the firewall and make determinations according to that flow. In embodiments, the system uses machine learning with this data over time to learn what types of data flows are acceptable (e.g., not a threat) and what types of data flows pose a risk (e.g., are a threat). Aspects of the invention build on this technique and take it a step further by segregating intelligently based on the use of the data.

In accordance with embodiments, the system uses software tools to create a data lake based on the application/inventory knowledge and the network knowledge. A data lake is a system or repository of data stored in its natural/raw format, usually object blobs or files. A data lake is usually a single store of all enterprise data including raw copies of source system data and transformed data used for tasks such as reporting, visualization, advanced analytics and machine learning. A data lake can include structured data from relational databases (rows and columns), semi-structured data (CSV, logs, XML, JSON), unstructured data (emails, documents, PDFs) and binary data (images, audio, video).

In embodiments, the application/inventory knowledge included in the data lake is obtained using software tools that determine which applications are running in the networked system, and which components (e.g., servers, VM's, routers, etc.) are included in the networked system. Tools that provide this type of data to the data lake may include one or more of: a server-configuration database; and a configuration management database (CMDB). The data lake may be federated or non-federated.

According to aspects of the invention, the network connectivity knowledge included in the data lake is obtained using software tools that determine how the applications in the networked system talk to each other (e.g., transfer data to each other) to perform their intended functions. Tools that provide this type of data to the data lake may include network visibility and analytics tools, such as tools that collect flow information from switches, routers, and other network devices. An example is a tool that determines that a first application (e.g., a sales application) talks to a second application (e.g., an inventory application), and that also determines that the components in a three tier application (e.g., web, middleware, and database) talk to each other. In embodiments, the system uses this data in a Bayesian analysis and also to define soft connections (e.g., a relatively low amount of data between two applications and/or components) versus hard connections (e.g., a relatively low amount of data between two applications and/or components). In embodiments, the system combines this connectivity knowledge with load balancers for risk analytics.

In embodiments, the system analyzes data in the data lake to determine affinities between components in the networked system, identify a threat to the networked system, determine a risk level of components affected by the threat, and determine and automatically initiate one or more actions to protect the networked system based on the threat and the risk level. The analysis may determine, for example, whether a detected threat (e.g., a bad patch) affects one type of machine in the networked system but not another type of machine in the networked system. The analysis may determine, for example, that some mission critical applications are already isolated from other network components at the time of the identified threat. The analysis may determine, for example, that a Multiprotocol Label Switching (MPLS) is infected, in which case the system may determine that routers should be provided with firewall placement and address adders. In aspects, the system provides reports to human users (e.g., IT teams), and the reports may indicate which areas of the network are shutdown so that the users can start the process of recovering their business applications. These examples are merely illustrative and are not intended to limit implementations of the invention. Other actions may be initiated based on the detected threat and determined risk level.

In one example, the system determines that a cyber-attack on the networked system originated in a particular geographic location. In this example, the system determines and automatically initiates actions including: isolating network connectivity into and out of the particular geographic location; disabling IPsec VPN's; creating new firewall rules; modifying access control lists; and other IP limiting functions.

In another example, the system determines that a threat affects only a specific data center in a networked system. In this example, the system determines and automatically initiates actions including: isolating the affected data center from the rest of the networked system; and shutting down a firewall or router.

In another example, the system determines that a threat affects an application in a networked system. As described herein, the system uses SDN processes to determine which other applications in the networked system talk to the affected application, and also to determine the types of communication (e.g., light, medium, heavy, etc.) between these applications and the affected application. Based on this, in this example, the system determines and automatically initiates an action selected from the group consisting of: create an additional, non-infected vLAN and transport the affected application into another vLAN or cluster with re-IP capability through the SDN; spin a firewall between the affected application and existing application segments (i.e., middleware and database, if they don't already exist); move non-infected applications into a created or existing micro-segmentation zone for further load-balancing for application uptime, noting that that micro-segmentation can do both firewalls and load-balancers; utilize SDN to spin off non-infected application components to non-infected areas; utilize software tooling to move infected VMs to the isolation zone for cleaning; and utilize SDN to tag and time backup networks based on network security and the scorched earth policy to ensure sites are resilient (e.g., backup location one is compromised, backup location two is okay, and any other non-IPd backups (i.e., traditional tape)). In embodiments, exogenous architectures are handled by transport mechanisms that shut down the offending sites.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
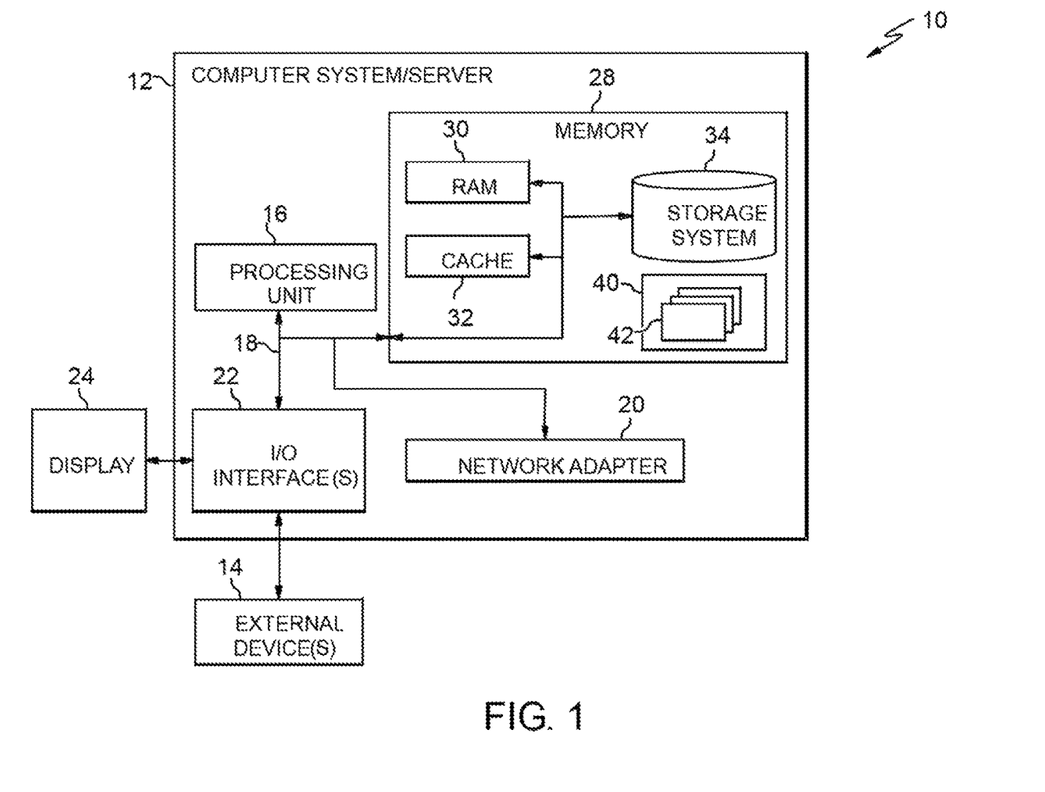
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
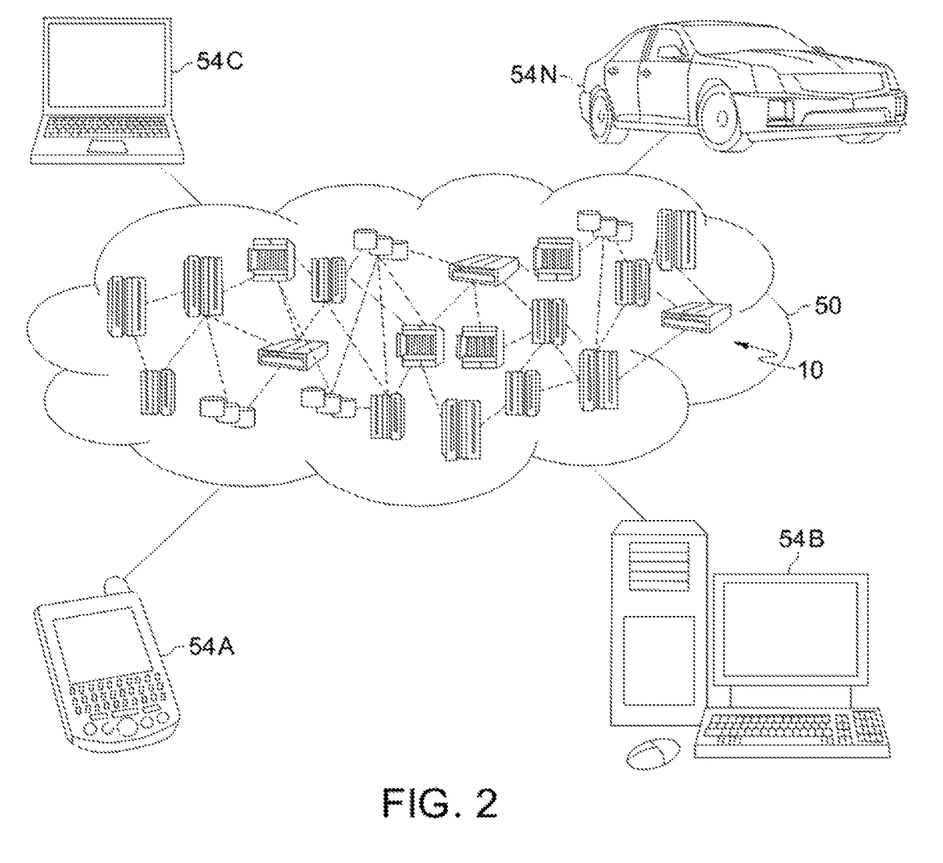
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
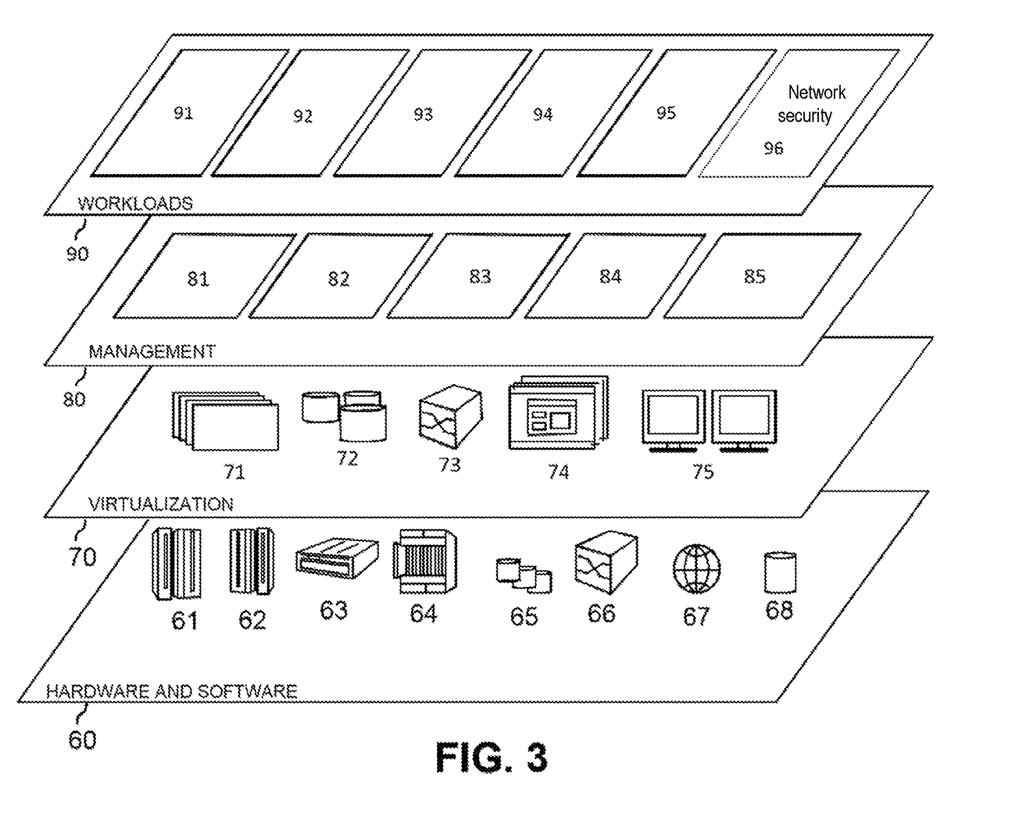
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network security 96.

Implementations of the invention may include a computer system/server 12 of FIG. 1 in which one or more of the program modules 42 are configured to perform (or cause the computer system/server 12 to perform) one of more functions of the network security 96 of FIG. 3. For example, the one or more of the program modules 42 may be configured to: determine affinities between components of a networked system; detect a threat to the networked system; trigger an automated action based on a risk assessment of the threat; and use SDN to automatically configure the networked system in response to the detected threat.

Figure 4:
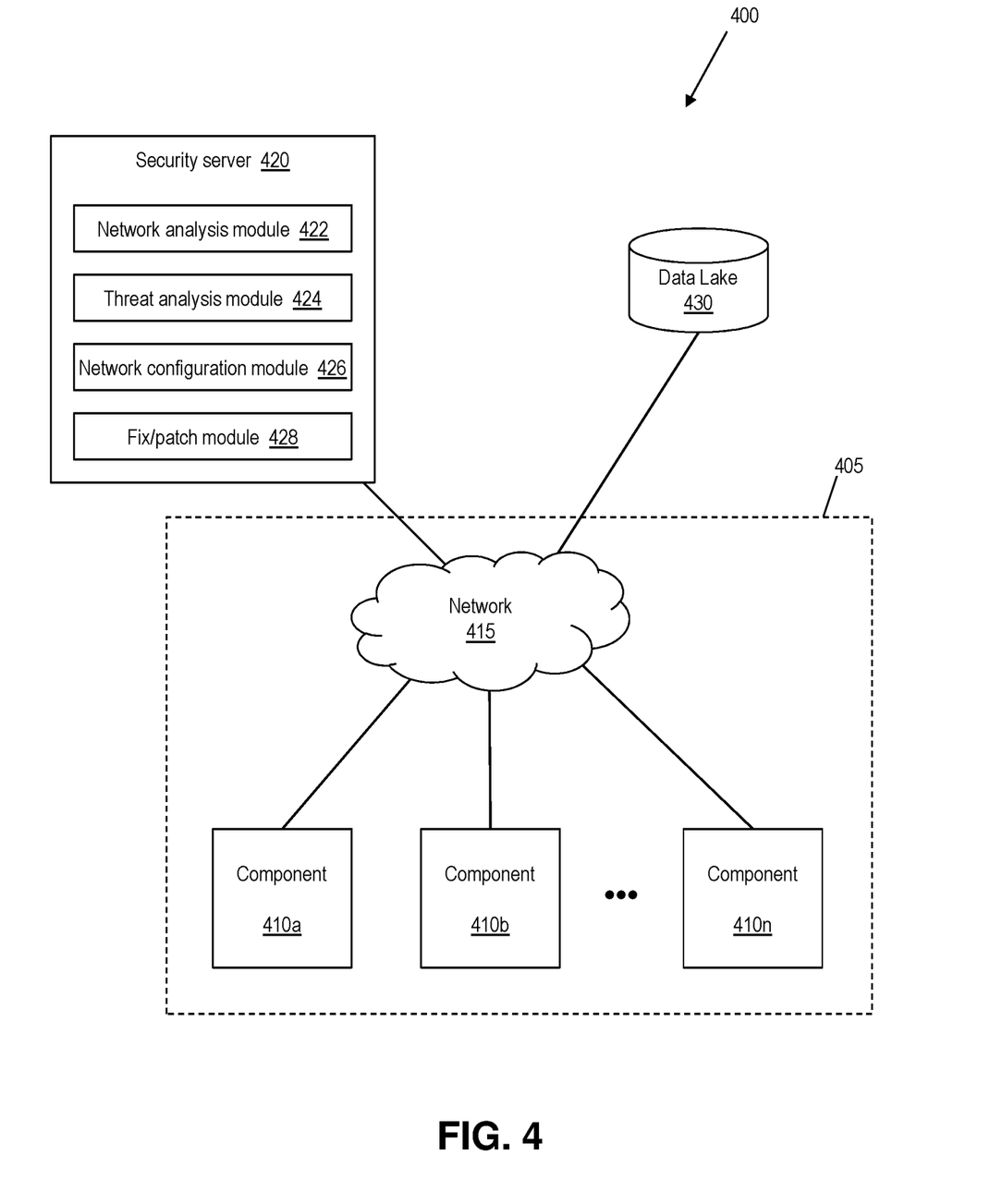
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a networked computer system (e.g., a networked system) 405 that includes a plurality of components 410*a*, 410*b*, . . . , 410*n*. There may be any number "n" of components 410*a-n* in the system 405, and various ones of the components 410*a-n* communicate with each other via a network 415. In embodiments, the components 410*a-n* comprise one or more of: one or more servers (e.g., bare metal servers, such as computer system/server 12 of FIG. 1); one or more virtual machines (VMs); one or more routers; one or more switches; one or more firewalls; one or more load balancers; and one or more software applications running on any of the previously mentioned components. The network 415 comprises one or more computer networks, such as one or more of a LAN, WAN, and the Internet. In a cloud implementation, the system 405 may be a cloud computing environment 50 and the components 410*a-n* may be one or more cloud computing nodes 10, e.g., as described with respect to FIG. 2.

According to aspects of the invention, the environment 400 includes a security server 420 and a data lake 430. The security server 420 comprises one or more computer devices, such as computer system/server 12 of FIG. 1, that run one or more program modules that are configured to perform processes described herein. In embodiments, the security server 420 comprises a network analysis module 422, a threat analysis module 424, a network configuration module 426, and a fix/patch module 428, each of which may comprise one or more software applications and/or program modules such as program modules 42 of FIG. 1. It is understood that although four modules 422, 424, 426, 428 are shown for illustration, the functions of any two or more of the modules may be combined into a single module. Additionally or alternatively, the functions of any one of the modules may be split into plural different modules.

In aspects of the invention, the network analysis module 422 is configured to determine affinities between various ones of the components 410*a-n* in the system 405. In embodiments, the network analysis module 422 comprises one or more software tools that are configured to analyze the system 405 to: identify the components 410*a-n* in the system 405 (e.g., the physical components connected in the system 405 and the software applications running on any of the physical components); and determine network communication (e.g., data flow) between various ones of the components 410*a-n* in the system 405. In embodiments, the network analysis module 422 stores the output(s) of the one or more software tools in the data lake 430. The one or more software tools may comprise but are not limited to: a server-configuration database; a configuration management database (CMDB); and network visibility and analytics tools, such as tools that collect data flow information from switches, routers, and other network devices. In embodiments, the network analysis module 422 continuously monitors network traffic between the components 410*a-n* and stores data defining this network traffic in near real time in the data lake 430.

As used herein, an affinity exits between two components 410*a-n* if there is network communication (e.g., data flow) between the components in the system 405. On the other hand, there is not an affinity between two components 410*a-n* that do not communicate with one another in the system 405. In embodiments, the network analysis module 422 analyzes the data in the data lake 430 to determine affinities between components 410*a-n* in the system. In one example, the network analysis module 422 determines that an affinity exists between two components (e.g., a first application and a second application) based on determining that there is network communication between the two components (e.g., the first application sends data to and/or receives data from the second application).

In aspects of the invention, the threat analysis module 424 is configured to determine a threat to one or more components 410*a-n* in the system 405 and a risk assessment associated with the threat. In embodiments, the threat analysis module 424 detects a threat using threat detection tools (e.g., anti-virus software) and/or machine-learning techniques. Threat detection tools are understood such that further explanation is not necessary.

In embodiments, machine-learning threat detection techniques involve the threat analysis module 424 using machine-learning algorithms to analyze the data in the data lake 430 to determine baseline characteristics (e.g., patterns) of the network communications in the system 405, and to determine deviations from the determined baseline characteristics. Examples of types of events that the threat analysis module 424 is configured to determine as threats include: a new affinity that did not previously exist between two components 410*a-n* of the system 405; increased amount of data transfer (relative to the baseline) between two components 410*a-n* of the system 405; and increased number of user accounts connected to (or attempting to connect to) a component 410*a-n* of the system 405. These examples are not limiting, and the threat analysis module 424 may be configured to determine other events as threats with appropriate programming.

In embodiments, the system permits a user to provide input to define threshold values that the threat analysis module 424 uses to determine whether a deviation rises to the level of a threat. For example, a user may set a threshold at 10% for log-in attempts at a server, and based on this a deviation of a 9% increase in log-in attempts over a defined time period would not be deemed a threat, whereas a deviation of a 12% increase in log-in attempts over a defined time period would be deemed a threat. In embodiments, the system permits a user to provide input in the form of feedback about a determined threat, e.g., where the feedback indicates that the determined threat is an actionable threat or that the determined threat is not an actionable threat, and the system uses this feedback to modify the algorithms that are used to determine the threat. In this manner, the system learns over time what types of events are more likely to be an actionable threat and what types of events are less likely to be an actionable threat.

According to aspects of the invention, in response to determining a threat, the threat analysis module 424 determines one or more automated actions to take based on a risk assessment that includes: a risk level of the threat itself; risk levels of various ones of the components 410a-n; a risk level of the system 405. In embodiments, the risk level of the threat itself is determined based on predefined rules, such as a virus is high risk level, a bad patch is a medium risk level, etc. In this manner, the threat analysis module 424 determines the type of threat and looks up the risk level for the determined type of threat.

In embodiments, the threat analysis module 424 determines a risk level of each component 410a-n in the system 405 using weighted factors and data from the data lake 430 to determine which of the factors applies to each component. The factors may include but are not limited to: redundancy in the component; micro-segmentation already in place around the component; connectivity of the component; maturity of the SDN for replication of the component; and affinity to other components. In aspects, the system permits a user to provide input to define each of the factors as one of high impact, medium impact, and low impact, and also to define numerical scores for each of high impact, medium impact, and low impact.

In embodiments, the threat analysis module 424 determines a risk level of the system 405 using the risk levels of the components 410a-n and the data from the data lake 430 to determine looseness/tightness of coupling between an affected component and components with an affinity to the affected component. Factors that determine the looseness/tightness of coupling between two components may include but are not limited to: how much data flows between the two components; and whether output from one component is needed by the other component. Risk level of the system may be determined using Bayesian analysis of data in the data lake, and in particular may comprise constructing a Bayesian attack graph for all components in the system, although other techniques may also be used.

In some implementations, the threat analysis module 424 determines the risk level of each component 410a-n and the risk level of the system 405 prior to a threat being detected, e.g., when the affinities are determined. However, implementations may also be configured to make this determination at the time the threat is detected.

According to aspects of the invention, the risk assessment of the threat is based on a combination of the risk level of the threat itself (threat risk), the risk levels of the respective components (component risk), and the risk level of the system (system risk). In embodiments, the threat analysis module 424 stores plural different rules that define one or more automated actions to take for a given risk assessment, e.g., for a given set of threat risk, component risk, and system risk. The actions may include: isolating an affected component (e.g., disconnect it from the vLAN); make clean copy of the affected component and connect it to the vLAN; re-IP one or more components in the vLAN; add a firewall between the affected component and other components; and other actions described herein. In this manner, the threat analysis module 424 determines at least one automated action to take based on the risk assessment of the threat.

In one example illustrating the factors used in determining the risk level of a component, redundancy in the affected component is defined as high impact, micro-segmentation already in place with the affected component is defined as low impact, connectivity of the affected component is defined as high impact, maturity of the SDN for replication is defined as high impact, and affinity of the affected component is defined as medium impact. In this example, high impact is assigned a score of 0.8, medium impact is assigned a score of 0.5, and low impact is assigned a score of 0.2. This provides an average number between 0.0 and 1.0 for Bayesian weighting used by the threat analysis module 424 for determining a risk level of the system 405 as described herein.

In another example of determining the risk level of components, the threat analysis module 424 determines a risk level by looking at a generalized application risk as a stand-alone system. In this example, the threat analysis module 424 determines whether there are multiple loadbalancers, whether the database is active-active, and the single-points of failure within the subsystems that have an affinity with the affected application. These items within the application itself are rated. In an illustrative example, the Single Point of Failure factor is assigned (e.g., by a user) a weighting of 10, the active-active database factor is assigned a weighting of 1, the active-passive database factor is assigned a weighting of 3, and the no database redundancy factor is assigned a weighting of 9. In this example, the threat analysis module 424 determines from the data in the data lake 430 the following scores for each factor for a first application (App1) and a second application (App2): App1 (Single Point of Failure) score=2; App1(Active Active database) score=3; App1(Active Passive Database) score=0; App1(No Database Redunancy) score=0; App2(Single Point of Failure) score=1; App2(Active Active database) score=3; App2(Active Passive Database) score=0; App2(No Database Redunancy) score=0. Continuing this example, the threat analysis module 424 determines a probability of App1 failing as (10×2)+(1×3)+(3×0)+(9×0)=23%, and a probability of App2 failing as (10×1)+(1×3)+(3×0)+(9×0)=13%. In embodiments, these respective probabilities correspond to a resiliency of each application.

In one example illustrating the factors used in determining the risk level of the system, the threat analysis module 424 determines a risk profile for the system 405 since various ones of the components 410a-n interact with each other in the system 405. In embodiments, the threat analysis module 424 applies the determined failure points of the individual components 410a-n to the system 405 to determine a risk analysis for the entire system 405. In embodiments, the threat analysis module 424 considers the tightness or looseness of coupling between ones of the components 410a-n when determining the risk profile of the system 405. For example, if App1 and App2 are tightly coupled (e.g., App1 is a credit check application and App2 is a credit balance lookup application) then the threat analysis module 424 scales their risk factors appropriately. Therefore, the pair (App1, App2) would have a risk factor of (0.23, 0.13) with a tighter coupling factor of 0, which corresponds to being very tightly coupled. In an alternative example, App1 is a credit check application and App2 is a backup. In this alternative example, App2 appears to be tightly coupled from network activity from the data lake 430, but which in actual practice is not needed for App1 to produce its output. In this alternative example, the threat analysis module 424 determines that the applications (App1, App2) have a coupling factor of 10, which corresponds to being very loosely coupled.

In aspects, the threat analysis module 424 uses these variables as the basis of the probability functions (the Bayesian models) to be applied across the application landscape. In embodiments, the threat analysis module 424 uses these risk profiles (e.g., the determined risk profile of the individual components and the determined risk profile of the system) in combination with a determined impact of the detected threat to determine an appropriate automated action based upon the threat and the risk level. In embodiments, the risk profiles of the components and the risk profile of the system are determined prior to the detection of a threat since these profiles can be determined using data that exists in the data lake 430 prior to the detection of any threat.

In another example, the threat analysis module 424 uses data from the data lake 430 to construct one or more Bayesian attack graphs that enable static and dynamic network risk assessments for the system 405. The examples described thus far for determining a threat and a risk level associated with the threat and exemplary and not limiting, and other procedures may be used so long as the algorithms used by the threat analysis module 424 take into account the determined affinities between ones of the components 410a-n of the system 405.

With continued reference to FIG. 4, the network configuration module 426 is configured to reconfigure a portion of the system 405 based on the threat and the risk assessment of the threat determined by the threat analysis module 424. In embodiments, the network configuration module 426 uses SDN to automatically reconfigure the system 405 to isolate all components directly affected by the threat and all components that have an affinity to an affected component. In embodiments, the reconfiguring involves automatically performing one or more of: creating an additional, non-infected vLAN and transporting an affected application into another vLAN or cluster with re-IP capability through the SDN; spinning a firewall between the affected application and existing application segments; moving non-infected applications into a created or existing micro-segmentation zone for further load-balancing for application uptime; utilizing SDN to spin off non-infected application components to non-infected areas; utilizing software tooling to move infected VMs to the isolation zone for cleaning; and utilizing SDN to tag and time backup networks based on network security and the scorched earth policy to ensure sites are resilient. In aspects, the network configuration module 426 comprises one or more network configuration software tools, such as SDN tools, that are used to perform the SDN functions described herein.

In embodiments, the system permits a user to provide input to define rules that are used by the system to determine which reconfiguration action(s) to perform under different threat circumstances. For example, one rule might state that for a second component that is loosely linked (e.g., loosely coupled, e.g., 10% utilization between the two) to a first component that is affected by the threat, if the second component has a high risk level due to no firewall being in place between the first component and the second component, then the actions to take in response to the threat include: (i) re-IP the first component; and (ii) install a firewall between the first component and the second component. As another example, another rule might state that for a second component that is loosely linked (e.g., loosely coupled, e.g., 10% utilization between the two) to a first component that is affected by the threat, if the second component has a low risk level due to a firewall already being in place between the first component and the second component, then the action to take in response to the threat include: (i) re-IP the first component.

These are but two illustrative examples of rules, and other variations of rules may be implemented based on one or more of the factors (e.g., redundancy in the affected component; micro-segmentation already in place with the affected component; connectivity of the affected component; maturity of the SDN for replication; and affinity of the affected component) to automatically trigger one or more of the reconfiguration actions (e.g., creating an additional, non-infected vLAN and transporting an affected application into another vLAN or cluster with re-IP capability through the SDN; spinning a firewall between the affected application and existing application segments; moving non-infected applications into a created or existing micro-segmentation zone for further load-balancing for application uptime; utilizing SDN to spin off non-infected application components to non-infected areas; utilizing software tooling to move infected VMs to the isolation zone for cleaning; and utilizing SDN to tag and time backup networks based on network security and the scorched earth policy to ensure sites are resilient). In embodiments, the security server 420 is programmed with many variations of different such rules and, in response to detecting a threat, the security server 420 performs one or more automated actions based on the rule(s) that apply to the situation surrounding the threat.

Figure 5:
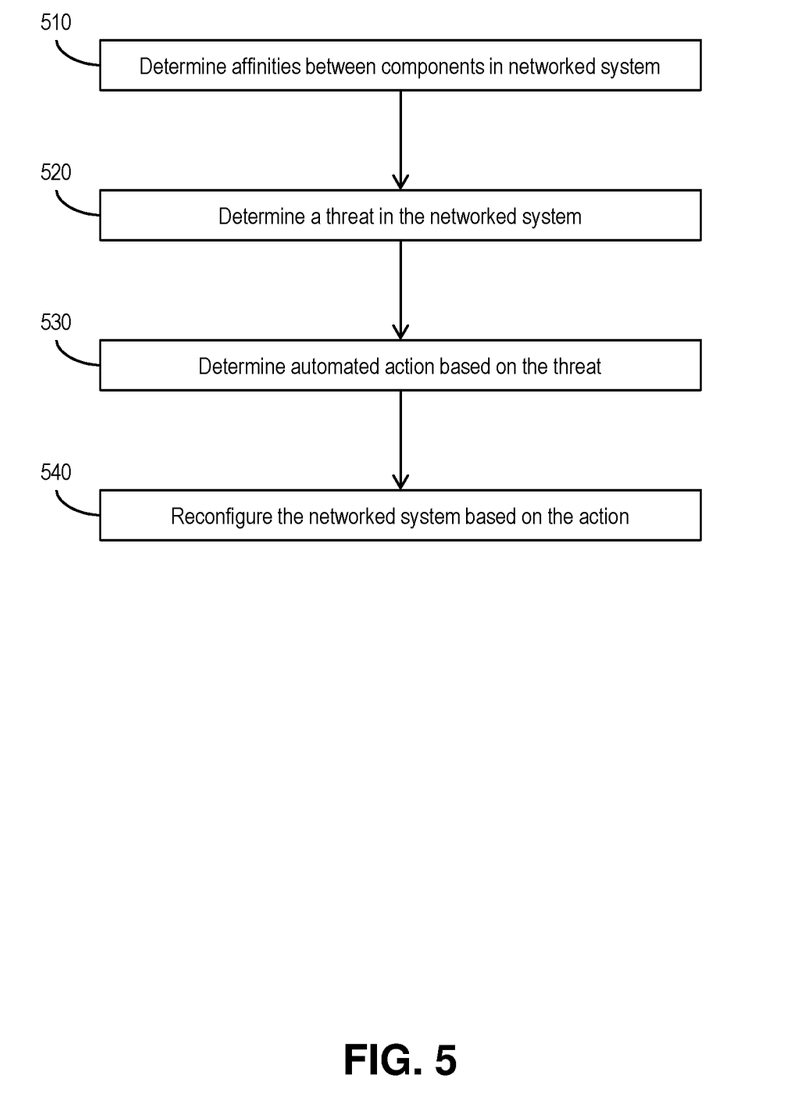
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 510, the security server determines affinities between components of a networked computer system. In embodiments, and as described with respect to FIG. 4, the network analysis module 422 determines affinities between various ones of the components 410a-n in the system 405 using one or more software tools that are configured to analyze the system 405 to: identify the components 410a-n in the system 405; and determine network communication between various ones of the components 410a-n in the system 405.

At step 520, the security server determines a threat. In embodiments, and as described with respect to FIG. 4, the threat analysis module 424 determines a threat to one or more components 410a-n in the system 405 and a risk assessment of the threat. In embodiments, the threat analysis module 424 detects the threat using threat detection tools (e.g., anti-virus software) and/or machine-learning techniques. In embodiments, and as described with respect to FIG. 4, the threat analysis module 424 determines a risk assessment based on: a risk level of the threat; risk levels of components; and a risk level of the system. As described herein, the risk levels of the components and the risk level of the system may be determined prior to the detecting the threat, e.g., at step 510.

At step 530, the security server determines an automated action based on the determined threat and risk assessment from step 520. In embodiments, and as described with respect to FIG. 4, the threat analysis module 424 stores plural different rules that define one or more automated actions to take for a given risk assessment, e.g., for a given set of threat risk, component risk, and system risk. The actions may include: isolating an affected component (e.g., disconnect it from the vLAN); make clean copy of the affected component and connect it to the vLAN; re-IP one or more components in the vLAN; add a firewall between the affected component and other components; creating an additional, non-infected vLAN and transporting an affected application into another vLAN or cluster with re-IP capability through the SDN; spinning a firewall between the affected application and existing application segments; moving non-infected applications into a created or existing micro-segmentation zone for further load-balancing for application uptime; utilizing SDN to spin off non-infected application components to non-infected areas; utilizing software tooling to move infected VMs to the isolation zone for cleaning; and utilizing SDN to tag and time backup networks based on network security and the scorched earth policy to ensure sites are resilient. In this manner, the threat analysis module 424 uses the risk assessment and the predefined rules to determine one or more automated actions to take in response to the threat.

At step 540, the security server automatically reconfigures the system 405 based on the determined action(s) from step 530. In embodiments, and as described with respect to FIG. 4, the network configuration module 426 uses SDN tools and techniques to perform the one or more reconfiguration actions that were determined at step 530.

Figure 6A:
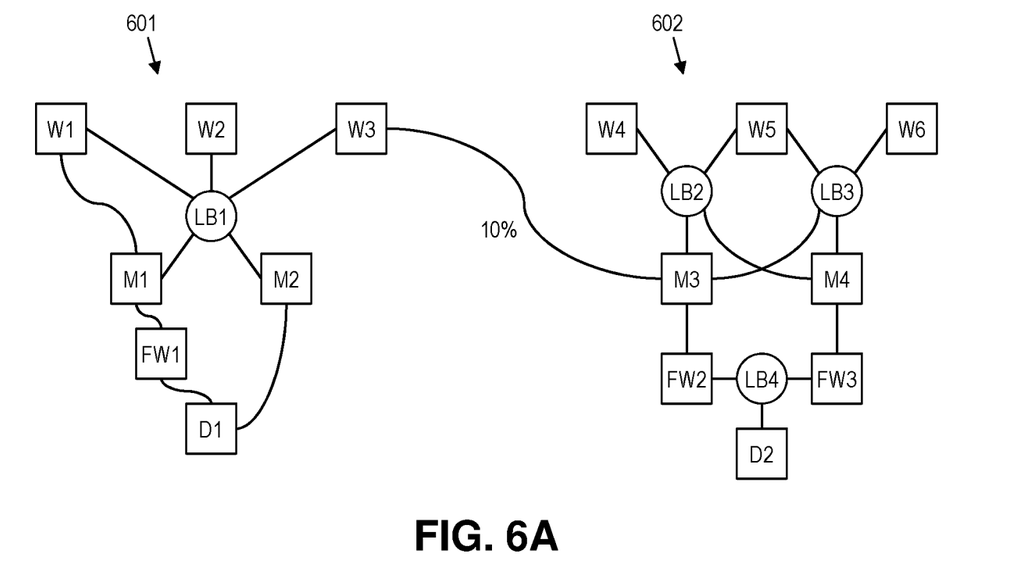
FIGS. 6A-C illustrate an exemplary use case in accordance with aspects of the invention.
Figure 6B:
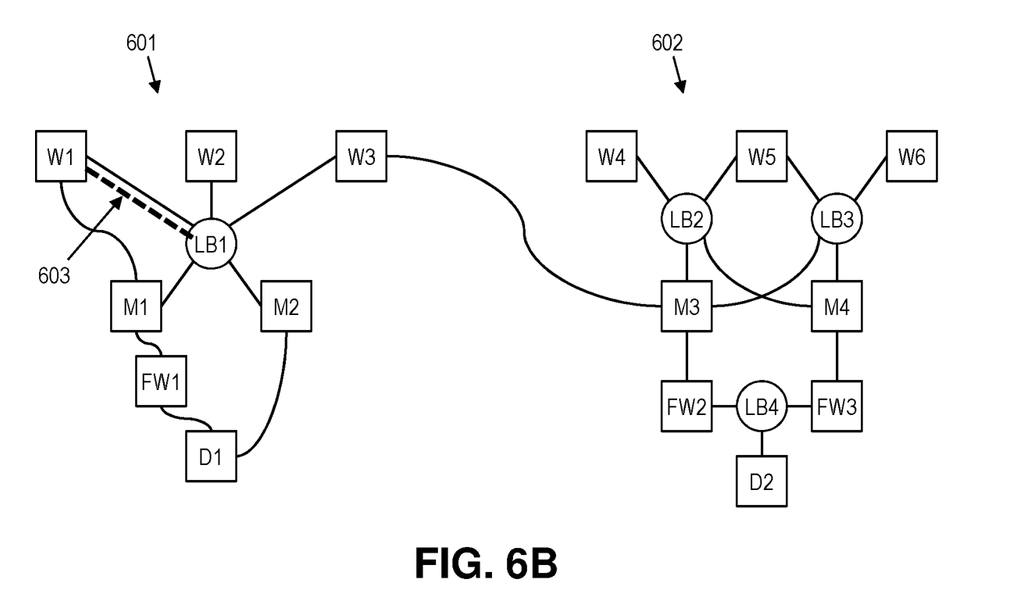
Figure 6C:
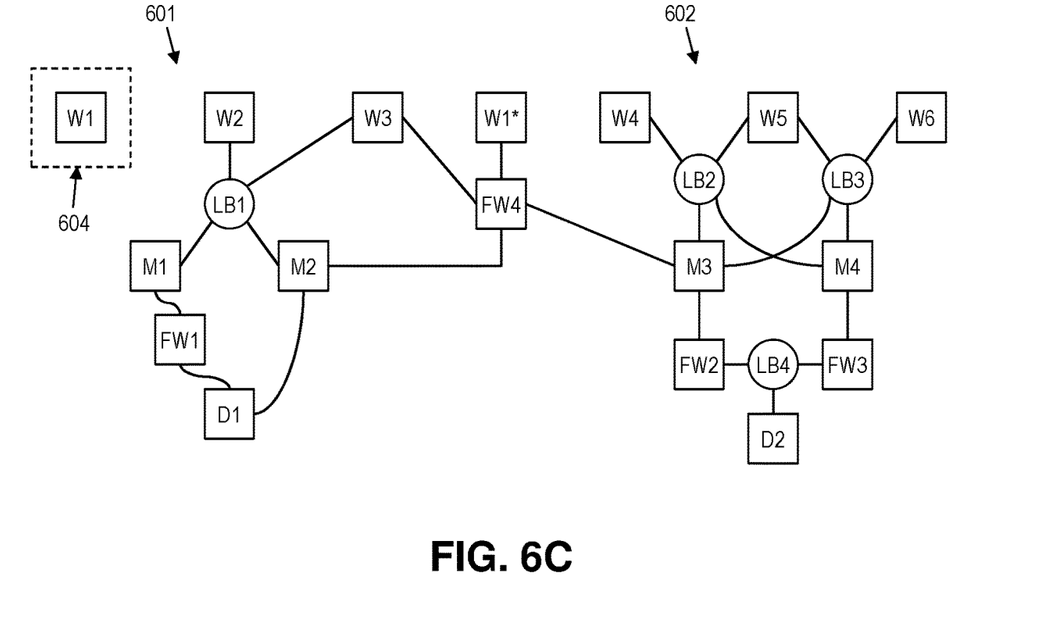

FIGS. 6A, 6B, and 6C illustrate an exemplary use case in accordance with aspects of the invention. Aspects of the use case are escribed with reference to elements depicted in FIG. 4 and steps of FIG. 5.

FIG. 6A shows a first group 601 and a second group 602 of components 410a-n of a system 405. The first group 601 includes web servers W1, W2, W3, application servers M1, M2, data server D1, load balancer LB1, and firewall FW1. The second group 602 includes web servers W4, W5, W6, application servers M3, M4, data server D2, load balancers LB2, LB3, LB4, and firewalls FW2, FW3. Solid lines between components represent network communication between the components. According to aspects of the invention, the network analysis module 422 determines a configuration of the components of the system 405 and the affinities between various ones of the components (e.g., as at step 510). During normal operation (e.g., no threats detected), the network analysis module 422 monitors the data flows between the components and stores data defining the data flows in the data lake 430.

In this example, the network analysis module 422 analyzes the data flows and determines that there is 10% utilization between the first group 601 and the second group 602, as indicated by the 10% at the line connecting W3 and M3. In this manner, the network analysis module 422 determines that the second group 602 is loosely linked (e.g., loosely coupled) to the first group 601. Also in this example, the threat analysis module 424 determines that the second group 602 has a high risk level relative to the first group 601 due to no firewall being in place between the first group 601 and the second group 602. As described with respect to FIG. 4, the threat analysis module 424 determines a risk level of each component based on factors such as: redundancy in the affected component; micro-segmentation already in place with the affected component; connectivity of the affected component; maturity of the SDN for replication; and affinity of the affected component.

FIG. 6B shows detecting a threat based on a new connectivity 603 detected between W1 and LB1 of the first group 601 in accordance with aspects of the invention. In embodiments, the network analysis module 422 monitors and stores data that defines the data flow between the components, and the threat analysis module 424 analyzes the data in the data lake to detect threats (e.g., deviations from baseline characteristics), e.g., as described at step 520. In this example, the threat analysis module 424 analyzes the data exchanged in the new connectivity 603 and determines that there is likely a virus or a bad patch in the W1 server.

FIG. 6C shows isolating the W1 server and reconfiguring other components of the system 405, e.g., as described at steps 530 and 540. In this example, in response to determining that the W1 server is affected by the threat, the network configuration module 426 isolates the W1 server from the rest of the system 405, e.g., by removing the vNIC of the W1 server. Also in this example, the network configuration module 426 adds a new server W1* to replace the W1 server that has been taken offline. Also in this example, the network configuration module 426 re-IPs the first group 601 and adds a new firewall FW4 between the first group 601 and the second group 602, e.g., based on a rule as described herein. In this manner, the network configuration module 426 automatically isolates the component directly affected by the threat (e.g., the W1 server) and automatically reconfigures the system 405 to protect other components that have an affinity to the component directly affected by the threat.

Still referring to FIG. 6C, in embodiments the affected component (e.g., the W1 server) is placed in an isolation zone, which may be a vLAN or micro-segmentation zone 604, while the affected component is repaired. For example, the fix/patch module 428 of the security server 420 operates to repair the affected component by: analyzing the affected component (e.g., using root cause analysis or other techniques); fixing the affected component (e.g., remove the malware); and patching the affected component (e.g., update the component to include the current security patches, etc.). In this example, after the affected component is repaired, the network configuration module 426 reconfigures the system 405 to revert back to its original state (shown in FIG. 6A), e.g., by reconnecting the W1 server to the first group 601 and by removing the replacement W1* server and firewall FW4.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a computer device, affinities between components in a networked computer system;
   determining, by the computer device, a risk level of each of the components;
   determining, by the computer device, a risk level of the networked computer system;
   detecting, by the computer device, a threat in the networked computer system;
   determining, by the computer device, an action based on the threat, the risk level of ones of the components affected by the threat, and the risk level of the networked computer system; and
   reconfiguring, by the computer device, the networked computer system based on the determined action.

2. The method of claim 1, further comprising creating a data lake by monitoring network traffic between the components in the networked computer system and storing data defining the monitored network traffic in the data lake, wherein the data lake includes:
   information that defines applications running in the networked computer system; and
   information that defines how the applications running in the networked computer system transfer data to each other; and
   wherein the determining the affinities comprises analyzing data stored in the data lake.

3. The method of claim 1, wherein the risk level of the networked computer system is determined using the affinities between the components.

4. The method of claim 3, wherein the determining the risk level of the networked computer system comprises performing a Bayesian analysis.

5. The method of claim 1, wherein the risk level of one of the components is determined using at least one factor selected from the group consisting of: redundancy in the component; micro-segmentation already in place around the component; connectivity of the component; maturity of a software defined network for replication of the component; and affinity to other components.

6. The method of claim 1, wherein the determining the action to perform is based on plural different rules that define one or more automated actions to take for a given set of threat risk, component risk, and system risk.

7. The method of claim 1, wherein the reconfiguring is performed automatically using software defined networking.

8. The method of claim 1, wherein the reconfiguring comprises isolating one of the components affected by the threat.

9. The method of claim 8, further comprising repairing the affected component by:
   analyzing the affected component;
   fixing the affected component; and
   patching the affected component.

10. The method of claim 9, further comprising reconfiguring the networked computer system to its original state after the analyzing, the fixing, and the patching.

11. The method of claim 1, wherein the detecting the threat comprises:
    analyzing data in a data lake to determine a baseline characteristic of the networked computer system; and
    detecting operation of the networked computer system that deviates from the baseline characteristic by more than a threshold amount.

12. The method of claim 1, wherein the computer device includes software provided as a service in a cloud environment.

13. A computer program product, the computer program product comprising one or more computer readable storage media having program instructions collectively stored on the one or more computer readable storage media, the program instructions executable to:
    determine affinities between components in a networked computer system by analyzing data in a data lake;
    detect a threat in the networked computer system;
    determine a risk assessment based on a risk level of the threat, risk levels of the components, and a risk level of the networked computer system;
    determine an action based on the risk assessment; and
    reconfigure the networked computer system based on the determined action.

14. The computer program product of claim 13, wherein the risk level of the networked computer system is determined using the affinities between the components.

15. The computer program product of claim 13, wherein the determining the risk level of the networked computer system comprises performing a Bayesian analysis.

16. The computer program product of claim 13, wherein:
    the reconfiguring is performed automatically using software defined networking;
    the reconfiguring comprises isolating one of the components affected by the threat; and
    further comprising reconfiguring the networked computer system to its original state after repairing the one of the components affected by the threat.

17. A system, comprising:
    a processor, a computer readable memory, and a computer readable storage medium;
    program instructions to determine affinities between components in a networked computer system by analyzing data in a data lake;
    program instructions to detect a threat in the networked computer system;
    program instructions to determine a risk assessment based on a risk level of the threat, risk levels of the components, and a risk level of the networked computer system;
    program instructions to determine an action based on the risk assessment; and
    program instructions to reconfigure the networked computer system based on the determined action and automatically using software defined networking,
    wherein the program instructions are stored on the computer readable storage medium for execution by the processor via the computer readable memory.

18. The system of claim 17, wherein the risk level of the networked computer system is determined using the affinities between the components.

19. The system of claim 17, wherein the determining the risk level of the networked computer system comprises performing a Bayesian analysis.

20. The system of claim 17, wherein the reconfiguring comprises isolating one of the components affected by the threat, and further comprising reconfiguring the networked computer system to its original state after repairing the one of the components affected by the threat.

* * * * *